United States Patent

Rinearson

[15] 3,682,410
[45] Aug. 8, 1972

[54] WIRE TENSIONING APPARATUS
[72] Inventor: Leonard C. Rinearson, 2115 Maple Grove Avenue, Dayton, Ohio 45414
[22] Filed: Nov. 17, 1970
[21] Appl. No.: 90,366

[52] U.S. Cl. ............... 242/75.53, 242/45, 242/155 B
[51] Int. Cl. .............................................. B65h 59/00
[58] Field of Search ...... 242/86.51, 75.53, 45, 155 R, 242/155 BW

[56] References Cited

UNITED STATES PATENTS

| 2,253,653 | 8/1941 | Robinson et al. | 242/75.53 UX |
| 2,536,537 | 1/1951 | Christiansen et al. | 242/155 R |
| 2,764,367 | 9/1956 | Brey | 242/155 R |
| 2,947,494 | 8/1960 | Merritt | 242/155 BW UX |
| 3,037,720 | 6/1962 | Leithiser, Jr. | 242/155 BW UX |
| 3,107,679 | 10/1963 | Pawlowski | 242/75.53 X |
| 3,168,261 | 2/1965 | Hainer | 242/86.51 |
| 3,232,558 | 2/1966 | Barkley et al. | 242/155 BW |
| 3,400,900 | 9/1968 | Goode | 242/155 BW |

Primary Examiner—Stanley N. Gilreath
Assistant Examiner—Milton Gerstein
Attorney—Marechal, Biebel, French & Bugg

[57] ABSTRACT

The wire tensioning apparatus for use with a wire winding device includes a pneumatic motor having a reel around which the wire is wound, a source of air pressure for urging the motor to rotate in a direction opposite to the direction of rotation when wire is withdrawn by the wire winding device, and regulator means for controlling the pressure against which the motor acts thereby to establish a controlled tension on the wire. An air switch between the air source and the motor is actuated by tension on the wire, and an air reservoir may be provided to rotate the motor in the forward direction when tension is removed thereby to remove tension from the wire completely.

7 Claims, 3 Drawing Figures

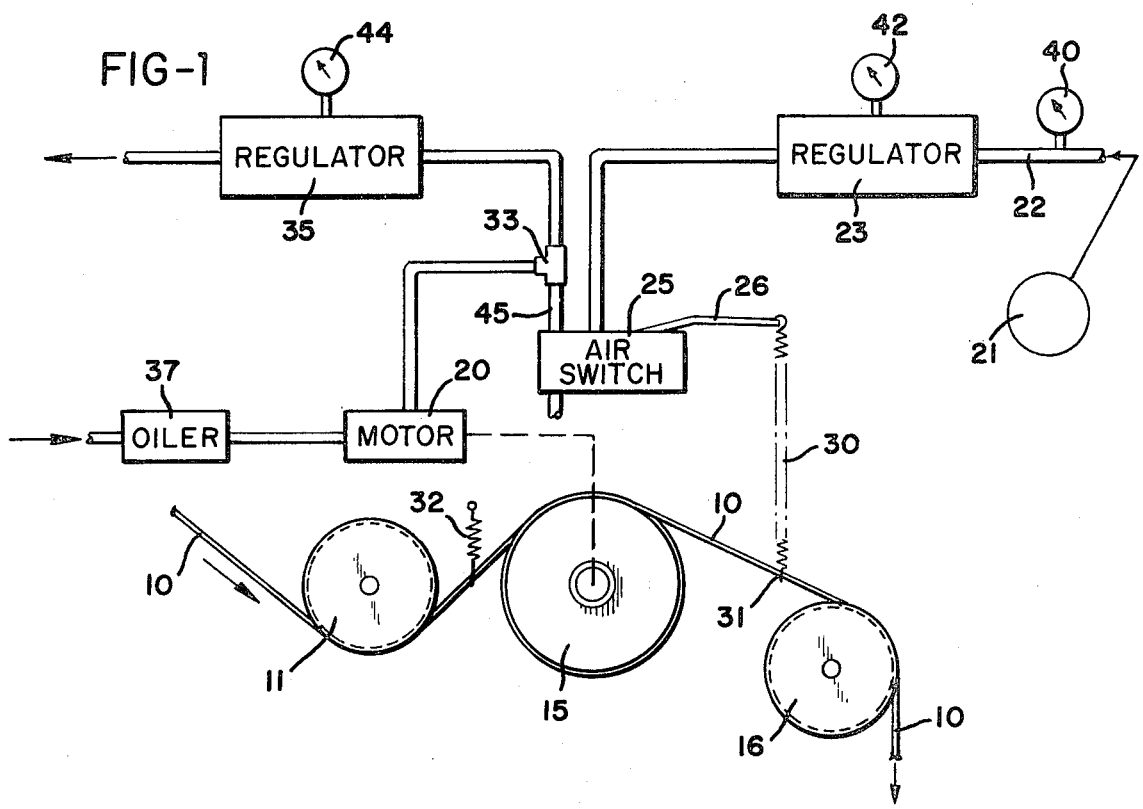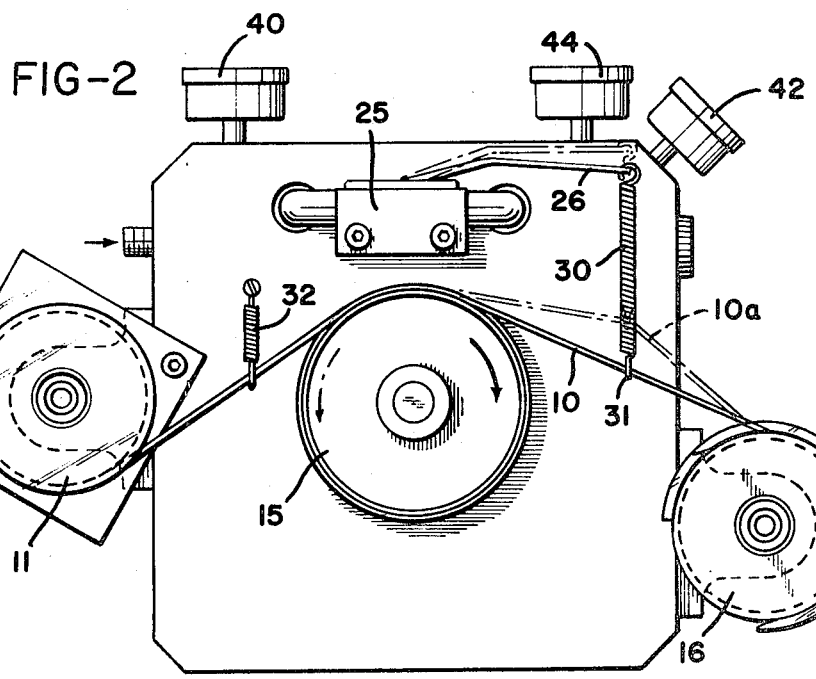

WIRE TENSIONING APPARATUS

BACKGROUND OF THE INVENTION

This invention relates to an apparatus for maintaining a constant tension on wire as it is withdrawn by a wire winding machine, such as the type used in winding electrical coils or stator and field windings of electric motors. In order to achieve uniform windings, it is desirable that the tension on the wire be maintained at a constant value throughout the winding operation. In addition, it is desirable to eliminate slack from the wire when changing from the winding of one coil to another to prevent breaking the wire when the winding operation is again started.

SUMMARY OF THE INVENTION

This invention relates to a wire tensioning device which will maintain a constant tension on a wire regardless of the speed or rate at which the wire is being withdrawn by a wire winding machine.

More particularly, this invention employs a pneumatic motor which is operated as a pump by the rotation of a reel around which the wire is wound as it is withdrawn by a wire winding machine. A regulated source of air is supplied to the motor which tends to rotate the motor in a direction to pull the wire away from the wire winding machine, and a pressure regulator controls the back pressure on the motor and thus the motor's resistance to rotation thereby to establish a regulated tension on the wire.

A pneumatic switch is connected between the motor and the regulated source of air with the switch being actuated by the tension on the wire between the motor and the wire winding device. By taking up slack in the wire, the switch will then be opened to allow air to be applied to the motor which then tends to rotate in a direction to establish a predetermined magnitude of tension on the wire prior to the commencement of the winding operation. Therefore, slack in the wire is first removed and the wire is then maintained under constant tension until wire is withdrawn from its source. Since slack is eliminated, the possibility of the wire breaking upon the initial starting up of the wire winding device is practically eliminated. It is also contemplated that the pneumatic motor and the reel around which the wire is would be made of lightweight, low inertia components to reduce the possibility of wire breakage on initial start up.

As the wire is being used by the wire winding device, the pneumatic motor rotates against the air pressure from the regulated source, and since it is rotating in the opposite direction, it acts as a pump. A constant pressure regulator is provided to regulate the back pressure on the motor to a constant value thus maintaining constant the resistance of motor to the movement of wire.

Two embodiments of the invention are disclosed, one using a rotor type motor wherein the tension controlling regulator is located on the input side of the motor, the other using a vane type motor wherein the regulator is located on the output side of the motor. When using the second embodiment, a pressure reservoir on the output side of the motor may be employed to run the motor when the air switch is closed thereby to feed the wire, or at least eliminate the tension on the wire to allow a lead loop to be established at the wire winding mechanism.

Accordingly, it is an object of this invention to provide a wire tensioning device of the type described which creates constant tension on the wire regardless of the speed at which the wire is being withdrawn by regulating the pressure of air generated by a pneumatic motor acting as a pneumatic pump; to provide an improved wire tensioning device of the type described where the motor is supplied with regulated pressure to create a tension on a wire prior to the movement of the wire; and to provide a wire tensioning device of the type described whereby the wire may either be fed or tension removed from the wire at the completion of a winding operation by supplying a small quantity of air to the motor from a reservoir.

Other objects and advantages of the invention will be apparent from the following description, the accompanying drawings and the appended claims.

BRIEF DESCRIPTION OF THE DRAWINGS

FIG. 1 is a schematic view showing the components making up one embodiment of the wire tensioning device of this invention;

FIG. 2 is an elevational view showing the preferred embodiment of the invention and particularly the relationship of the pneumatic switch to the wire under tension and to the reel mounted to rotate the pneumatic motor.

DESCRIPTION OF THE PREFERRED EMBODIMENT

Figure 3:
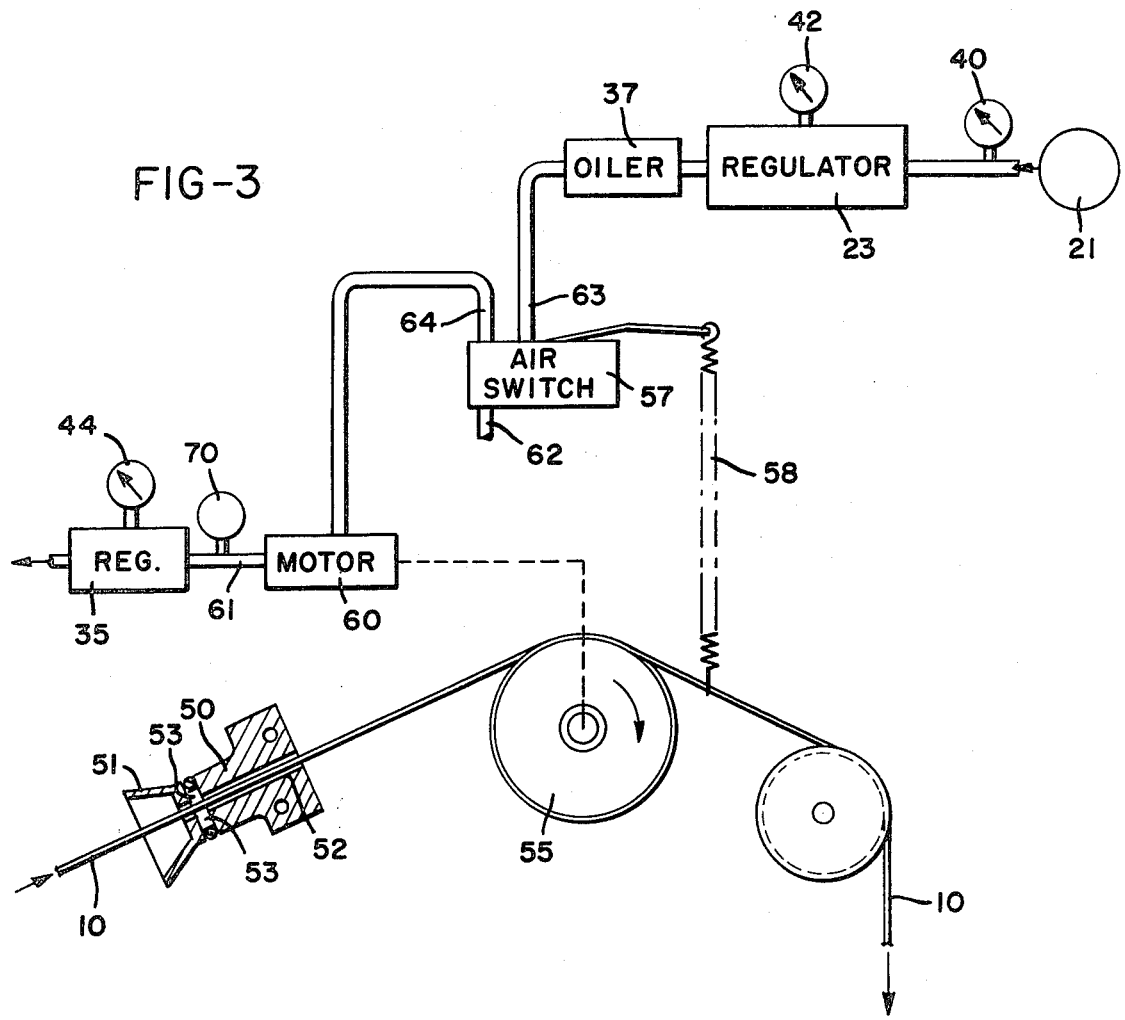
FIG. 3 is a schematic view of another embodiment of the invention.

Referring now to the drawings which illustrate preferred embodiments of the invention, FIG. 1 is a schematic view showing one embodiment employing a rotor type pneumatic motor. A wire 10 from a wire source, not shown, is directed by a pulley 11 around reel 15 and pulley 16 to a utilization device, such as a wire winding apparatus. The wire winding apparatus withdraws the wire at a rate which it controls, and the tension on the wire will be determined by the apparatus of this invention. The wire 10 is wound around reel 15 several times, i.e., two to five turns, to increase the frictional contact between the wire and the reel.

Reel 15 is mounted to rotate pneumatic motor 20, which, in this embodiment, is a rotor type motor Model OA–2, manufactured by Charlynn Orbit Aire. An axial piston type motor may also be used in this embodiment. Air pressure from source 21 is applied on input line 22 and through a regulator 23 to a normally closed pneumatic switch 25. Regulator 23 is a Model BO4–101–M1EA regulator with filter manufactured by Norgren. The pneumatic switch is a wire tension sensing means which connects the air from the source to the motor 20 when the tension on the wire 10 between the reel 15 and pulley 16 is greater than a predetermined value. The actuating arm 26 of the switch is operably connected to the wire by a spring 30 which has an eyelet 31 through which the wire 10 passes.

Referring to FIG. 2, the wire shown to the right of the reel 15 in the solid lines is under a tension greater than the above mentioned predetermined value and causes the switch to be placed in the open position. The wire 10a shown by the dashed lines in FIG. 2 shows a wire under tension less than the predetermined value and allows the switch to return by internal spring action to its normally closed position. Spring 32, located between pulley 11 and reel 15 aids in holding the wire tight against the pulley.

When the air source is applied to the motor 20 through the air switch 25, this causes the motor to tend to rotate in a direction shown by the dashed arrow opposite to the direction of rotation when wire is being withdrawn by the utilization device.

The input to the motor is also connected through a T-connection 33 to a second regulator 35. This regulator maintains constant the pressure of air on the input to the motor and will cause a controlled tension to be applied to the wire 10 by the motor through the reel 15. Regulator 35 may be a Norgren Model R04-100-NNRA.

When wire is being withdrawn by the utilization device, the motor 20 therefore acts as a pneumatic pump and will draw in air from an outside source through oiler 37, and then direct this air through regulator 35. Oiler 37 may be a Norgren Model 10-004-018. While air switch 25 is open, air from the air source through regulator 23 will also be passing through the regulator 35 since it will not vent through the motor 20 due to the motor's efficiency. Regulator 35 thus vents not only the pressure from regulator 23, but any pressure developed by the rotation of the motor due to the movement of the wire.

The magnitude of the input pressure may be observed on pressure gauge 40, the pressure of regulator 23 may be observed by gauge 42, and the output pressure on the motor as determined by regulator 35 may be observed on gauge 44.

Thus, regulator 23 is adjusted to provide the desired tension on the wire 10 prior to operation, but with the air switch 25 in the open position. Regulator 35 is adjusted to provide the desired restraint on the wire by the resistance of reel 15 to movement to provide the desired tension when the wire is being withdrawn by the utilization device. When desired, the motor 20 may be rotated without pressure restrictions when air switch 25 is in its normally closed position by providing the air switch with a self-relieving valve to allow any pressure in the line 45 to be released through the valve.

The embodiment of the invention previously described utilizes a rotor type pneumatic motor which has a relatively high efficiency and therefore does not permit air to bleed through the motor. This type of motor is useful when controlling the tension on heavier wires. However, when used with small gauge wires, it is desirable to have the lowest inertia components available, and for this purpose the embodiment of the invention shown in FIG. 3 may be used. In this embodiment, a vane type pneumatic motor, such as a Model 1AM motor manufactured by Gast, is employed having a lightweight reel attached thereto. This permits quick start up of the wire with less likelihood of wire breakage.

Referring now to FIG. 3, the wire 10 is withdrawn from its source through a wire cleaning mechanism 50 which includes a wire receiving cup 51 and a central opening 52. A pair of felt pads 53 extend radially into the opening 52 and engage the wire to remove any contaminates which may be adhering to the wire. These felt pads also provide a minor amount of tension to the wire and assist in holding the wire tight against reel 55. The wire is then wound around reel 55 and directed to the utilization device. Tension on the wire between the reel and the utilization device is sensed by air switch 57 through spring 58.

As in the previously described embodiment, air from a source 21 is directed through regulator 23 and air switch 57 to the input of motor 60. The output 61 of the motor is connected to a regulator 35 where it is then vented to the atmosphere. Since air flows in only one direction through the motor due to its vane rotor construction regardless of the direction of motor rotation, oiler 37 is installed on the input side of the motor.

Pneumatic switch 57 is a Mead Model MV70P three-way valve which operates as follows: when in the normally closed position, port 64, which is connected to the input of motor 60, is vented to the atmosphere through part 62 and port 63 is closed; and when in the open position, and this occurs when tension on the wire 10 is established above a predetermined value, ports 63 and 64 are connected to each other and the vent to the atmosphere is closed.

Thus, in normal operation, the source of air pressure is applied to the input to the motor through ports 63 and 64 and switch 57 thus causing the motor to tend to rotate in a direction to apply tension to the wire. As wire is withdrawn by the utilization device, it causes the motor to rotate in the opposite direction against the back pressure established by regulators 23 and 35.

Pressure regulator 23 is normally adjusted to a maximum of 50 psi while pressure regulator 35 is adjusted to a maximum of 20 psi, thus providing a 30 to 50 pound back pressure on the motor to control the tension applied to the wire 10. The resulting tension will of course, depend on the efficiency of the motor.

When winding motors, and particularly the stator winding of a motor, several winding operations are performed in sequence, and as the winding mechanism indexes from one position to another, it is desirable to maintain the wire under tension at all times. For this reason, continuous air pressure on the motor 60 may be provided. When winding armatures of motors, it is often desirable to remove the tension on the wire in order to provide a "lead loop". For this purpose, the invention includes a reservoir 70 on the output side of the motor which accumulates a small quantity of air under pressure during normal operations. When the switch 57 returns to its closed position, air in the reservoir 70 will be vented both through the regulator 35 and through the motor 60 and will cause the motor to tend to rotate in a direction to feed the wire. Actually, only a small amount of wire is fed forward but more importantly the tension on the wire from the action of the motor is removed completely so that the wire may be advanced to provide the lead loop prior to the continuation of the winding operation.

While the forms of apparatus herein described constitutes preferred embodiments of the invention, it is to be understood that the invention is not limited to these precise forms of apparatus, and that changes may be made therein without departing from the scope of the invention which is defined in the appended claims.

What is claimed is:

1. Wire tensioning apparatus for use with a device for withdrawing wire from a source, said apparatus comprising a pneumatic motor:
a reel around which wire may be wound, said reel being mounted to rotate with said motor;
said motor acting as a pneumatic pump while wire is being withdrawn by the device;
a source of air pressure;
wire tension sensing means for connecting said air source to said motor when tension on said wire between said reel and the device is greater than a predetermined value;
said source of air tending to rotate said motor in a direction opposite to the direction opposite of rotation of the reel when wire is being withdrawn by the device; and
regulator means for maintaining a constant back pressure on said motor while wire is being withdrawn by the device thereby to maintain a constant, controlled tension on said wire.

2. The apparatus of claim 1 wherein said source of air pressure includes means for regulating the pressure of air from said source and the input to said motor.

3. The apparatus of claim 1 wherein said wire tension sensing means includes a pneumatic switch and a spring connected between said switch and said wire at a point between said reel and the device whereby the tension on said wire may be sensed by said spring to control the operation of said pneumatic switch.

4. The apparatus of claim 3 wherein said pneumatic switch vents the input to said motor when said tension decreases below said predetermined value, said apparatus further including a pressure reservoir for discharging air into said motor and said switch in a direction to rotate said motor to permit withdrawal of the wire from said apparatus without tension.

5. The apparatus of claim 1 wherein said pneumatic motor is a rotor type motor and wherein said regulator means for maintaining a constant back pressure on said motor includes a pressure regulator installed on the input to said motor whereby air from said motor, when rotated by said wire, and air from said source is discharged through said regulator means.

6. The apparatus of claim 1 wherein said pneumatic motor is a vane type motor and wherein said regulator means for maintaining the constant back pressure on said motor includes a pressure regulator on the output side of said motor which cooperates with said source of air pressure to provide a predetermined resistance of said motor to movement of said wire.

7. Wire tensioning apparatus for use with a device for withdrawing wire from a source, said apparatus comprising
a pneumatic motor;
a reel around which wire may be wound, said reel being mounted to rotate with said motor;
said motor acting as a pneumatic pump while wire is being withdrawn by the device;
a source of air pressure; and
wire tension sensing means for connecting said air source to said motor when tension on said wire between said reel and the device is greater than a predetermined value;
said source of air tending to rotate said motor in a direction opposite to the direction of rotation of the reel when wire is being withdrawn by the device thereby to establish a controlled tension on said wire.

* * * * *